Aug. 16, 1927.

J. E. FOSTER 1,638,841

AUTOMATIC SYNCHRONOUS CONVERTER SYSTEM

Filed Nov. 28, 1923

WITNESSES:
A.G. Schiefelbein
A.H. Pendleton

INVENTOR
Julius E. Foster.
BY
Wesley G. Carr
ATTORNEY

Patented Aug. 16, 1927.

1,638,841

UNITED STATES PATENT OFFICE.

JULIUS E. FOSTER, OF PITTSBURGH, PENNSYLVANIA, ASSIGNOR TO WESTINGHOUSE ELECTRIC & MANUFACTURING COMPANY, A CORPORATION OF PENNSYLVANIA.

AUTOMATIC SYNCHRONOUS-CONVERTER SYSTEM.

Application filed November 28, 1923. Serial No. 677,558.

My invention relates to synchronous-converter systems and particularly to polarity-controlling devices therefor.

One object of my invention is to provide means whereby a synchronous converter shall automatically attain a predetermined polarity in its field windings.

Another object of my invention is to provide a device, of the above-indicated character, that shall automatically insure a predetermined polarity in a direct-current circuit.

A further object of my invention is to provide a device of the above-indicated character that shall be simple and inexpensive to construct and reliable and effective in its operation.

My invention comprises, in general, an alternating-current supply circuit, a direct-current distribution circuit, and a rotary or synchronous converter connected therebetween. The circuit in which my invention is embodied is connected between the direct-current terminals of the converter and comprises a rectifier and the operating coil of a magnetically-operated switch, connected in series relation. The switch that is actuated by the coil is held by a spring in one of its two operating positions when the operating coil is de-energized. When this coil is energized, the switch is actuated to its other operating position to reverse the direction of current traversing the field-magnet windings of the converter.

Figure 1:
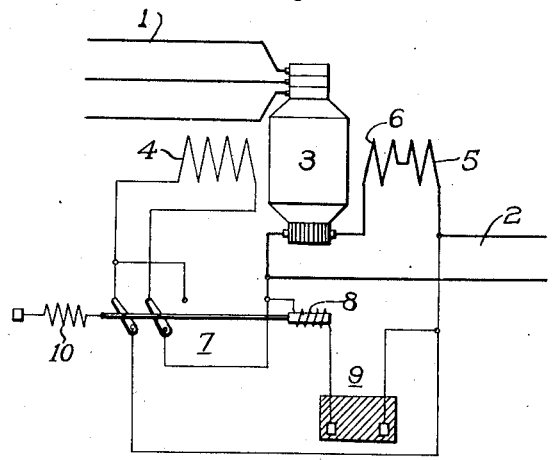
Figure 1 is a diagrammatic view of an electrical system embodying my invention in its preferred form.

Referring to Figure 1, an alternating-current supply circuit 1 supplies energy to the direct-current distribution circuit 2 through a rotary or synchronous converter 3. The converter 3 has a shunt field-magnet winding 4, a series field-magnet winding 5 and a commutating field-magnet winding 6. The shunt winding 4 is so connected, through a reversing switch 7, as to be energized from the direct-current terminals of the converter 3 which are operatively connected to the direct-current distribution circuit 2.

The reversing switch 7 has an operating coil 8 that is connected, in series with an electrolytic rectifier 9, across the direct-current terminals of the converter 3. A spring 10 holds the switch 7 in the operating position shown in the diagram when the coil 8 is de-energized. When the coil 8 is energized, however, the switch 7 is actuated to its other operating position to reverse the connections between the direct-current terminals of the converter 3 and the shunt field-magnet winding 4 to thereby reverse the direction of the current traversing the winding 4.

The electrolytic rectifier 9 is so connected that it strongly opposes any current traversal between its electrodes, and thus through the coil 8, when the polarity of the voltage between the direct-current terminals of the converter 3 is of the predetermined value that is desired. When this voltage has the correct polarity, therefore, insufficient current is permitted to traverse the coil 8 to actuate the switch 7 against the tension of the spring 10 and, consequently, the connections to the winding 4 are not reversed.

When the voltage between the direct-current terminals of the converter 3 has incorrect polarity, that is, opposite to that which is desired in the circuit 2, the rectifier 9 permits sufficient current to traverse the circuit extending between the direct-current terminals of the converter 3 through the rectifier 9 and operating coil 8 to actuate the switch 7 to its other operating position to thereby reverse the connections of the shunt field-magnet winding 4. The direction of the current traversing the winding 4 is thus reversed to thereby reverse the polarity of the voltage between the direct-current terminals of the converter 3. The polarity is now correct, and the rectifier 9 so opposes a current traversal of its circuit as to preclude energization of the coil 8 and permit the switch 7 to be returned to its de-energized position by the spring 10.

During the period when the converter 3 is being started, that is, before it attains synchronous speed, the voltage across the direct-current terminals of the converter alternates at a frequency that is directly proportional to the difference between the instantaneous speed of the converter and its synchronous speed corresponding to the frequency of the supply circuit 1. Each time the voltage between the direct-current terminals of the converter has incorrect polarity, the switch 7 tends to reverse the connections to the shunt field-magnet winding 4 to thereby correct this polarity in the manner described.

During the time when the speed of the converter 3 is considerably below synchronous speed, the frequency of alternations of the voltage between the direct-current terminals of the converter may be great enough to preclude actuation of the switch 7 at each alternation, but, as soon as the speed approaches synchronism, this frequency is low enough to permit the switch 7 to be actuated readily at each alternation to thereby establish the correct predetermined polarity of the circuit 2. Thus, when the converter 3 commences to operate synchronously from the supply circuit 1, a constant voltage having the correct predetermined polarity, has been established between the direct-current terminals of the converter and across the direct-current distribution circuit 2. This circuit, therefore, may safely be connected to any other direct-current circuit of substantially the same voltage and polarity without determining the polarity of the circuits to be so connected.

Figure 2:
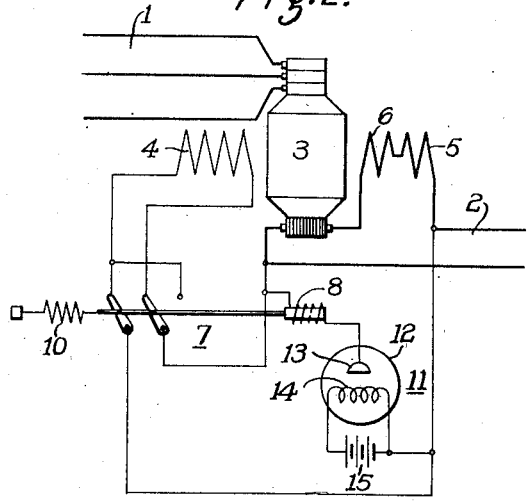
Fig. 2 is a diagrammatic view of an alternative method of practicing my invention, in which like reference numerals are used for like parts of the apparatus.

Figure 2 of the drawings, shows an alternative method of practicing my invention. The same apparatus and connections are used as those described above except that a hot-cathode rectifier 11 is used in place of the electrolytic rectifier 9. The rectifier 11 comprises a closed bulb 12, an anode 13 and a filament-type cathode 14 that is heated by current from a battery 15. The rectifier 11 functions in a well-known manner to permit current to traverse the circuit extending between the terminals of the converter 3 through the rectifier 11 and the operating coil 8 of the switch 7 in one direction only, causing the switch 7 to be actuated in the manner previously described.

It is understood that the system embodying my invention is not limited to the use of any particular type of rectifier or to any of the other specific details described, as numerous changes may be made therein without departing from the spirit and scope of my invention, as set forth in the appended claims.

I claim as my invention:

1. The combination with a supply circuit, a distribution circuit, and an electrical translating device connected therebetween, of rectifying means connected across the terminals of the translating device, and means so connected in series with the rectifying means as to be energized only when the polarity of the translating device is incorrect for effecting reversal of said polarity.

2. The combination with an alternating-current supply circuit, a direct-current distribution circuit having a predetermined polarity, and an electrical converting device comprising field-magnet windings connected therebetween, of a shunt circuit connected between the direct-current terminals of the converting device comprising a rectifier and the operating-magnet coil of a switch so connected that its actuation causes the current traversing the field-magnet windings of the converting device to be reversed, said rectifier being so disposed as to permit current to traverse said circuit between the direct-current terminals of the converting device when, and only when, the voltage between the direct-current terminals of the converting device has a polarity opposite to the predetermined polarity of the distribution circuit.

3. The combination with an alternating-current supply circuit, a direct-current distribution circuit having a predetermined polarity, and an electrical converting device comprising field-magnet windings connected therebetween, of rectifying means and a magnetically-operated switch controlled by the rectifying means that is adapted to be actuated to reverse the direction of the current traversing the field-magnet windings, of the converting device when the voltage between the direct-current terminals of the converting device has a polarity opposite to the predetermined polarity of the distribution circuit, said rectifying means being so disposed as to preclude current traversal of the rectifying means and of the operating magnet-coil of the magnetically-operated switch when the voltage between the direct-current terminals of the converting device has the same polarity as the predetermined polarity of the distribution circuit.

4. The combination with an alternating current supply circuit, a direct-current distribution circuit having a predetermined polarity, and an electrical converting device comprising field-magnet windings connected therebetween, of a magnetically-operated switch and rectifying means that are adapted to permit current to traverse the coil of the switch-operating magnet to thereby actuate the switch to reverse the direction of the current traversing the field-magnet windings of the converting device when, and only when, the voltage between the direct-current terminals of the converting device has a polarity opposite to the predetermined polarity of the distribution circuit.

In testimony whereof, I have hereunto subscribed my name this 16th day of November, 1923.

JULIUS E. FOSTER.